United States Patent [19]

Okada et al.

[11] Patent Number: 4,878,184

[45] Date of Patent: Oct. 31, 1989

[54] ELECTRONIC THERMOMETER WITH PREDICTING MEANS

[75] Inventors: Masamichi Okada; Isao Kai, both of Kyoto, Japan

[73] Assignee: Omron Tateisi Electronics Co., Kyoto, Japan

[21] Appl. No.: 13,295

[22] Filed: Feb. 10, 1987

[30] Foreign Application Priority Data

Feb. 10, 1986 [JP] Japan ................................ 61-27318
Feb. 14, 1986 [JP] Japan ................................ 61-31496
Feb. 21, 1986 [JP] Japan ................................ 61-38038

[51] Int. Cl.⁴ ........................ G06F 15/42; G01K 3/00
[52] U.S. Cl. ................................ 364/557; 128/736; 364/413.03; 374/107; 374/164; 374/170
[58] Field of Search ............... 374/102, 107, 134, 168, 374/169, 170; 364/557, 577, 413.03; 128/736

[56] References Cited

U.S. PATENT DOCUMENTS

| | | | |
|---|---|---|---|
| 3,785,207 | 1/1974 | Brzezinski | 374/168 X |
| 3,978,325 | 8/1976 | Goldstein et al. | 374/170 X |
| 4,176,556 | 12/1979 | Takenaka | 374/170 |
| 4,541,734 | 9/1985 | Ishizaka | 374/169 |
| 4,574,359 | 3/1986 | Ishizaka et al. | 374/107 X |
| 4,592,000 | 5/1986 | Ishizaka et al. | 364/413.03 X |
| 4,629,336 | 12/1986 | Ishizaka et al. | 128/736 X |
| 4,648,055 | 3/1987 | Ishizaka et al. | 374/107 X |
| 4,691,713 | 9/1987 | Suzuki | 128/736 |
| 4,727,500 | 2/1989 | Jackson et al. | 128/736 X |

FOREIGN PATENT DOCUMENTS

2822276 1/1979 Fed. Rep. of Germany.
2538108 12/1983 France.
2133562 7/1984 United Kingdom.

OTHER PUBLICATIONS

Patent Abstracts of Japan, vol. 8, No. 153 (P-287) [1590], Jul. 17, 1984.
Patent Abstracts of Japan, vol. 9, No. 199 (P-380) [1922], Aug. 16, 1985.
Patent Abstracts of Japan, vol. 9, No. 207 (P-382) [1930], Aug. 24, 1985.
Patent Abstracts of Japan, vol. 8, No. 1 (P-246) [1438], Jan. 6, 1984.
Patent Abstracts of Japan, vol. 8, No. 175 (P-294) [1612], Aug. 11, 1984.

Primary Examiner—Parshotam S. Lall
Assistant Examiner—Edward R. Cosimano
Attorney, Agent, or Firm—Wegner & Bretschneider

[57] ABSTRACT

An electronic thermometer comprising a sensing member for sensing a temperature to be taken thereby, a storage member for storing therein a measured value representing the sensed temperature by a sensing member, a prediction member for computing a predicted value S(t) based on the measured value T(t) stored in a storage member, a display member for displaying the measured value or the predicted value, and a judging member for determining whether or not a response value, of a response curve based on the measured data, has attained a predetermined value so as to initiate an operation for changing a state of the display member.

5 Claims, 8 Drawing Sheets

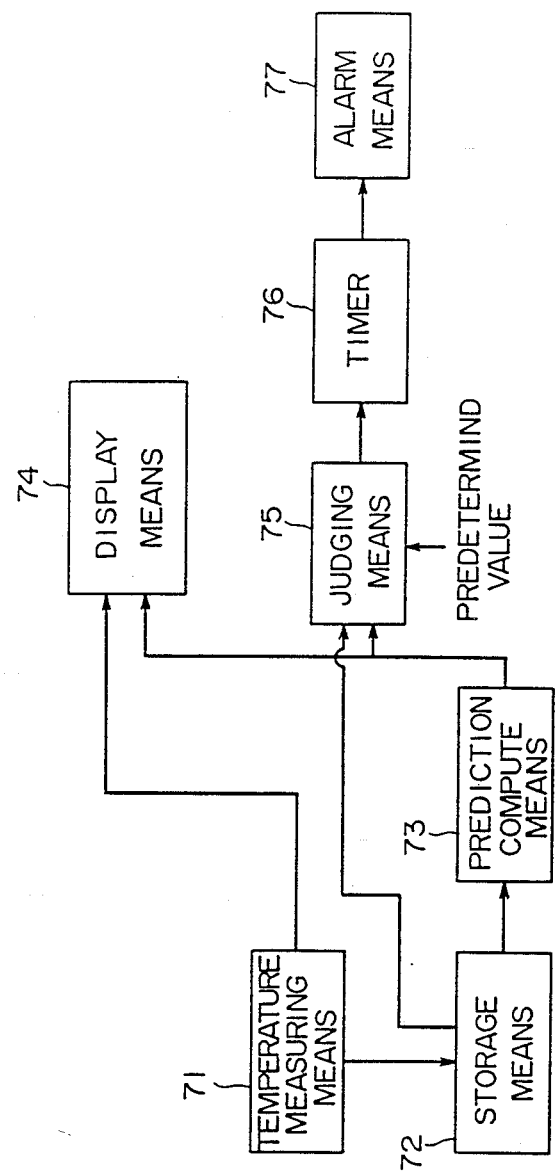

ELECTRONIC THERMOMETER WITH PREDICTING MEANS

FIELD OF THE INVENTION

This invention relates to an electronic thermometer employing a temperature sensor which displays a body temperature value, and more particularly to an improved electronic thermometer having means for predicting a converged or anticipated temperature value corresponding to a body temperature to be taken.

BACKGROUND OF THE INVENTION

Electronic clinical thermometer is currently available which takes a body temperature for a predetermined time interval, calculates a converged temperature value or a predicted body temperature value based on the changes of the measured temperature data, and displays the computed value to reduce the time interval for taking the body temperature. The several sampled temperature data are taken in the reduced short time period, so that the difference between the computed predicted value and the taken temperature value is rather large and the predicted value displayed in the reduced short time interval is unstable and not reliable. Therefore, the conventional electronic thermometer has the disadvantages that the predicted inaccurate temperature on display is misread by an observer of the thermometer as a correct body temperature, which reults in inaccurate measurement.

SUMMARY OF THE INVENTION

It is therefore a general object of this invention to provide an electronic thermometer having means for predicting a converged temperature value, which results in accurate, reliable and easily obtained measurements.

It is a further object of this invention to provide an electronic clinical thermometer which provides a precise body temperature display.

It is another object of this invention to provide an electronic thermometer which displays an anticipated or predicted temperature value only in a predetermined condition.

It is still another object of this invention to provide an electronic thermometer which changes a predicted temperature display form to a measured temperature form in a predetermined condition to provide more reliable temperature display.

It is still another object of this invention to provide an electronic thermometer which may precisely inform an operator of the completion of a body temperature measurement.

An electronic thermometer in accordance with this invention includes sensing means for an electronic thermometer comprising sensing means for sensing a temperature to be taken thereby, storage means for storing therein a measured value representing the sensed temperature by the sensing means, prediction means for computing a predicted value based on the measured value stored in the storage means, display means for displaying the measured value or the predicted value, and judging means for determining whether or not a response value of a response curve based on the measured data has a predetermined value so as to initiate an operation for changing a state of the display means.

Other objects and advantages of this invention will be apparent to those skilled in the art from the following description of the preferred embodiments in conjunction with the appended drawings.

BRIEF DESCRIPTION OF THE DRAWINGS

FIG. 7 is a block diagram illustrating a basic construction of an electronic thermometer incorporating a third embodiment of this invention;

DETAILED DESCRIPTION

Figure 1:
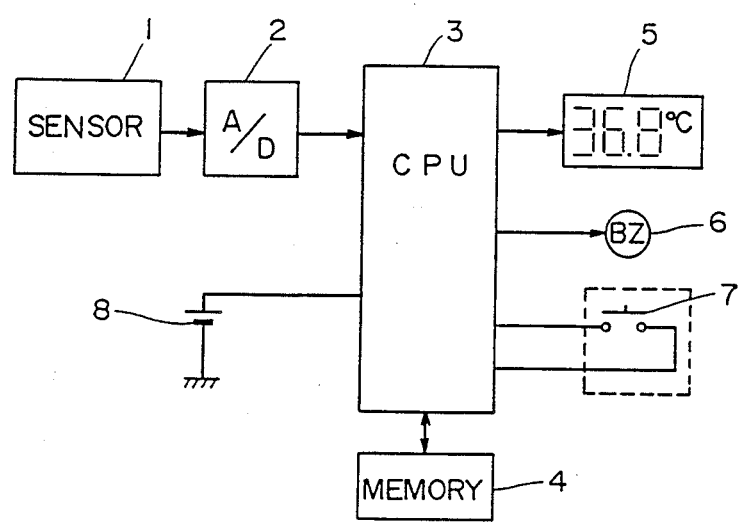
FIG. 1 is a schematic block diagram of an electronic thermometer incorporating an embodiment of this invention.

Referring now to FIG. 1 of the drawings, there is shown a basic construction of an electronic thermometer, which may be applicable to an electronic clinical thermometer for hospital or home use, embodying features of this invention.

A temperature sensor 1 such as a thermistor or other temperature responsive transducer provides an electric signal, representing the body temperature sensed under the tongue or arm of a patient, to an analog-to-digital converter 2 in which the signal representing the temperature data is converted from analog to digital form for application to a CPU 3.

When power switch 7 is turned on, the CPU 3 actuates the sensor 1 so as to store the temperature data into a memory for connected thereto. The CPU 3 includes parameter judging means for analyzing a rise in temperature or a response curve to confute a predicted value. That is, the parameter judging means judges whether or not the parameter P is in accordance with a predetermined normal rate of temperature rise that would be experienced in taking body temperatures. The CPU 3 also includes prediction computing means for computing a converged or predicted value based on the parameter P in accordance with a predetermined algebraic expression. The CPU 3 also includes display switching means for comparing the measured temperature value with the predicted value produced by the prediction computing means to produce a difference value and for switching a display of the measured temperature to the predicted value when the computed difference value falls within a predetermined threshold value, e.g., 0.5° C.

The parameter judging means analyzes a response curve about the changes of temperatures sensed by the temperature sensor to compute a parameter P which is expressed by the ratio of change rates of the response curve or the variation curve of the sensed temperature. Whether or not the temperature change vs. time shows a normal body temperature measurement is judged by finding whether or not the parameter P is within a predetermined range. By way of example, in preferred embodiments of this invention, this predetermined range may be selected at the range between 0.38 and 0.68 in accordance with clinical experimental data. If the computed parameter P exists within the range, the measurement is regarded as a body temperature measurement and a predicted value is computed. When not within the range, the measurement is regarded as non-body temperature measurement, e.g. as a hot water measurement, and a predicted value is not computed. The parameter P is computed according to the following formula:

$$P = \frac{(T_2 - T_1)/(t_2 - t_1)}{(T_1 - T_0)/(t_1 - t_0)} \qquad (1)$$

wherein T represents a sensed temperature and t represents a time. The parameter P may be computed according to another formula such as the ratio of changes of gradients, the ratio of the ratios of changes of gradients or the like, if desired.

The above-mentioned prediction computing means for computing a predicted value is activated only when the parameter judging means judges the measurement by this thermometer as a body temperature measurement, in which case the converged value is predicted according to the change rates of the sensed temperatures or the grades of the response curve. The predicted value S(t) is computed as follows:

$$S(t) = T(t) + [a(t+b)^2 + c]dT/dt \qquad (2)$$

wherein T(t) represents a sensed temperature at a sampling timing in an elapsed time t from start of the measurement. The sensed temperature T(t), its measuring time t and the rising rate of the sensed temperature at a sampling time provide factors to be computed. $a(-0.002)$, $b(-200)$ and $c(30)$ are constants.

The CPU 3 is further connected with a power source 8 and a buzzer 6 alarming that the predicted value becomes a predetermined value.

Figure 2:
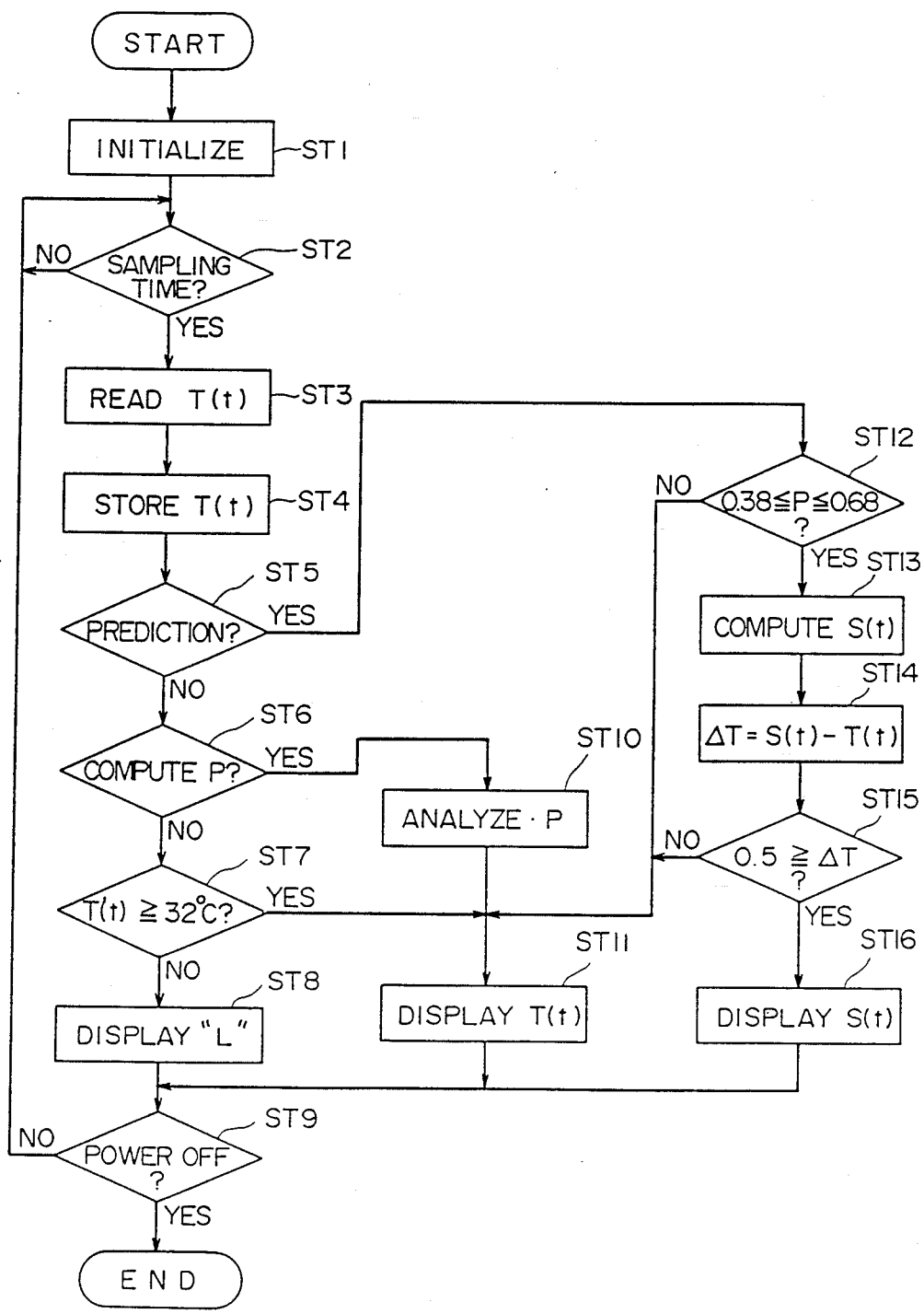
FIG. 2 is a flow chart illustrating the operations by the electronic thermometer of FIG. 1.

In FIG. 2, the operations by the electronic thermometer in this embodiment are illustrated. Upon turning on the power switch 7, the thermometer is initialized in step ST 1. In step ST 2, whether it is a sampling time or not is inquired. If it is not a sampling time, CPU 3 loops back to step ST 2. If a sampling time, the sensed temperature T in the sensor 1 is read by the CPU 3 to be stored in the memory 4 (steps ST 3 and ST 4). For each sampling cycle, the following operations are performed and the sequence will return to step ST 2. The sampling cycle is selected as one seconds in this embodiment.

In step ST 5, there is an inquiry by CPU 3 whether or not the prediction by the prediction computing means is available. By way of example, if 40 seconds elapsed from the start of the measurement, the prediction is judged to be available, whereby the prediction producing temperature data, viz. the sensed temperature $T_0$, $T_1$ and $T_2$ at the respective time points $t_0(=20$ seconds), $t_1(=30$ seconds) and $t_2(=40$ seconds), are available for computing the parameter P. If the prediction is not available, the sequence of operation advances to step ST 6 to determine if a judgement parameter P is computable for judging whether or not a body temperature measurement is executed. If it is within 40 seconds from the start, for example, the judgement parameter P is not computable since the number of sensed temperatures T is not enough to compute the same and the sequence advances to step ST 7 to inquire if the current sensed temperature is 32° C. or higher.

If the sensed temperature is 32° C. or higher, the sensed or measured temperature value is displayed on the display 5 (ST 11). If below 32° C., a mark "L" is displayed (ST 8). The sequence of operations flows to step ST 9, and returns to step ST 2 until the power switch 7 is turned off.

The sequence from ST 2 to ST 9 is repeated for 40 seconds from the start of the measurement. If 40 seconds elapses, the computation of the parameter P becomes available and a "YES" response is produced from step ST 6 for application to step ST 10 where the CPU 3 analyzes the time vs. temperature response curve to compute the parameter P. That is, the response curve of the sensed temperature T against time t is analyzed to compute the parameter P by using the above-mentioned formula (1). The parameter P is given by the respective sensed temperatures $T_0$, $T_1$ and $T_2$ at the time points $t_0=20$ seconds, $t_1=30$ seconds and $t_2=40$ seconds as follows:

$$P=(T_2-T_1)/(T_1-T_0) \qquad (3)$$

Then, the current measured temperature is displayed on the display (step ST 11), and the sequence returns to step ST 2.

At the subsequent sampling time which is 40 seconds from the start time, the prediction by the prediction computing means becomes available since the parameter is obtained, so that a "YES" response is produced in step ST 5 to be applied to step ST 12 where the CPU 3 inquires if the parameter P is within the predetermined range, viz. within the clinical data. The state $P>0.68$ shows a rapid temperature rise other than body temperature, while the state $P<0.38$ shows a slow temperature rise. Both states represent incorrect or strange measurements for a human body temperature.

Thus, if the parameter P is out of the range, a "NO" response is produced from step ST 12 and applied to step ST 11 so that the measured temperature T is displayed as it is without predicting any converged or predicted temperature. This feature enables the electronic thermometer to be used as a thermometer to measure a temperature of hot water.

If the parameter P is within the predetermined range, a "YES" response representing a predetermined body temperature measurement is produced from step ST 12 and applied to step ST 13 where a predicted value S(t) is computed according to the above-mentioned formula (2). Subsequently the difference ΔT between the predicted value and the measured temperature is produced in step ST 14, and is inquired whether the difference is below a predetermined value in step ST 15. The predetermined value is selected as 0.5° C. in this embodiment.

If the difference is larger than 0.5° C., the predicted values S(t) is regarded as unstable and not displayed. The actually measured temperature is displayed instead as shown in FIG. 3 (step ST 11).

Figure 3:
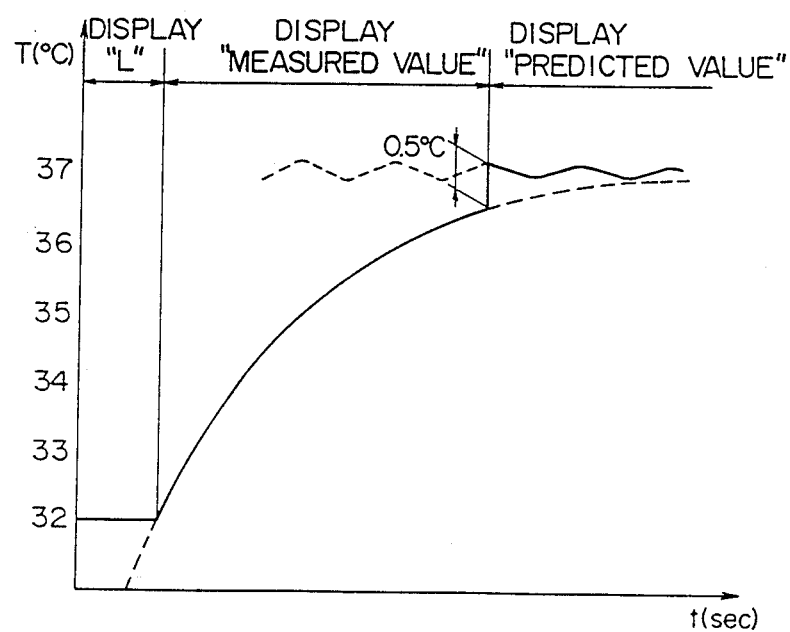
FIG. 3 is a graph illustrating a temperature display method of the thermometer.

If the measured temperature reaches a temperature at which the difference between the measured temperature and the predicted value is 0.5° C., the step ST 15 produces a "YES" response whereby the predicted value is displayed instead of the measured temperature as shown in FIG. 3 (step ST 16). At the same time the buzzer 6 gives the alarm to notify the operator that the predicted value on the display is a reliable body temperature value. Thus, the body temperature to be taken is quickly displayed by the representation of the predicted or anticipated value without waiting for the sensor to finally stabilize at the actual body temperature. Upon turning off the power switch 7 (step ST 9), the sequence of the measurement operations is finished.

The electronic thermometer in this embodiment according to this invention compares the predicted value with the actually measured temperature value, and does not display the predicted value until the difference between the compared values is decreased to a predetermined value. Accordingly, the predicted value on display represents a reliable converged temperature at which the sensed temperature by the sensor will finally stabilize, so that the operator can quickly measure the body temperature without doubting nor misunderstanding the displayed predicted temperature value. Moreover, since the predicted value is displayed only when the difference is below the predetermined value, it is also possible to display the predicted value with a desired accuracy by selecting a corresponding predetermined value.

Figure 4:
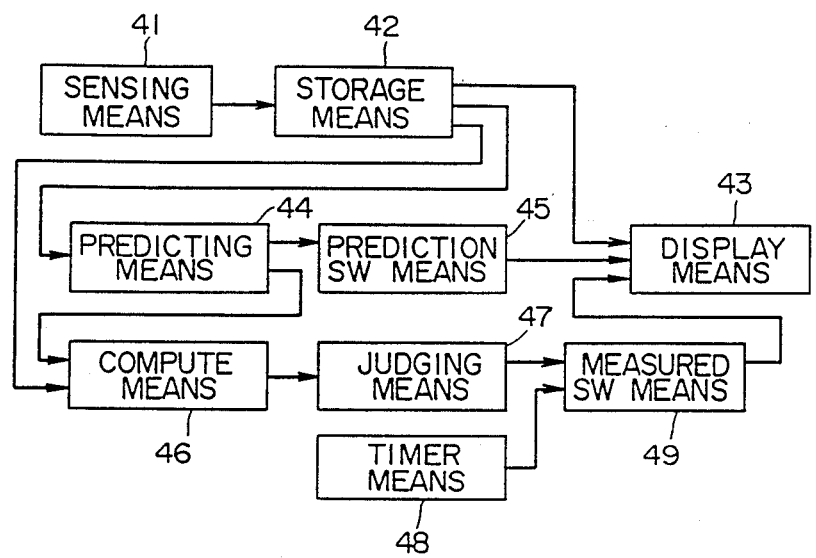
FIG. 4 is a block diagram illustrating a basic construction of an electronic thermometer incorporating a second embodiment of this invention.

Referring to FIG. 4, there is shown a basic construction of another electronic thermometer which is modified from the thermometer in the foregoing embodiment in accordance with a second embodiment of this invention. The electronic thermometer of FIG. 4 includes sensing means 41 for sensing a temperature to be measured, storage means 42 for storing therein actual measured values taken by the sensing means 41, display means 43 for displaying the measured values, prediction computing means 44 for predicting or anticipating a converged temperature corresponding to actual body temperature, prediction switching means 45 for switching a measured temperature form to a predicted temperature form on the display means 43, compute means 46 for computing characteristic values of the changing measured values, judging means 47 for judging if the computed characteristic values are within a predetermined range, timer means 48 for timing a predetermined time period from a base time point after the start of the temperature measurement, measured value switching means 49 for switching the display means 43 from the predicted temperature form to the measured temperature form according to either judgement by the judging means 47 or conclusion of the period being timed by timer means 48.

The construction shown in FIG. 4 is illustrated rather in detail about the functions stored in a CPU of the thermometer in this embodiment which is embodied by the construction shown in FIG. 1. Accordingly, the same components and steps in this embodiment as those in the foregoing embodiment shown in FIGS. 1 through 3 are represented by the same reference numerals, and the same explanation is omitted from the following description for simplification.

Figure 6:
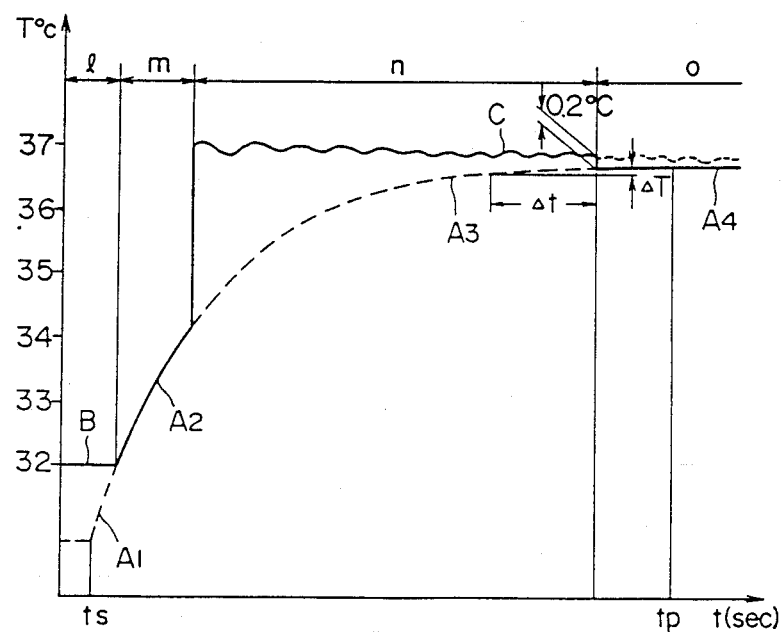
FIG. 6 is a graph illustrating a response curve of measured temperature values according to time elapsing.

The sensing means 41 of FIG. 4 is embodied by sensor 1 and A/D converter 2 of FIG. 2. The storage means 42 is embodied by memory 4, and the display means 43 is embodied by display 5. The CPU 3 of FIG. 1 embodies the means 44 through 49 of FIG. 4. The CPU 3 includes means for analyzing the respective portions $A_1$ through $A_4$ of a response curve representing the change of actually measured temperatures T according to time t elapsing as shown in FIG. 6 to compute a parameter P in accordance with the above-mentioned formula (1) to determine if a body temperature is measured. The prediction computing means 44 computes a predicted or anticipated value S(t) according to the above-mentioned formula (2) under the same conditions. Further explanation of the construction of FIG. 4 and FIG. 1 will be described in conjunction with FIGS. 5 and 6.

Figure 5:
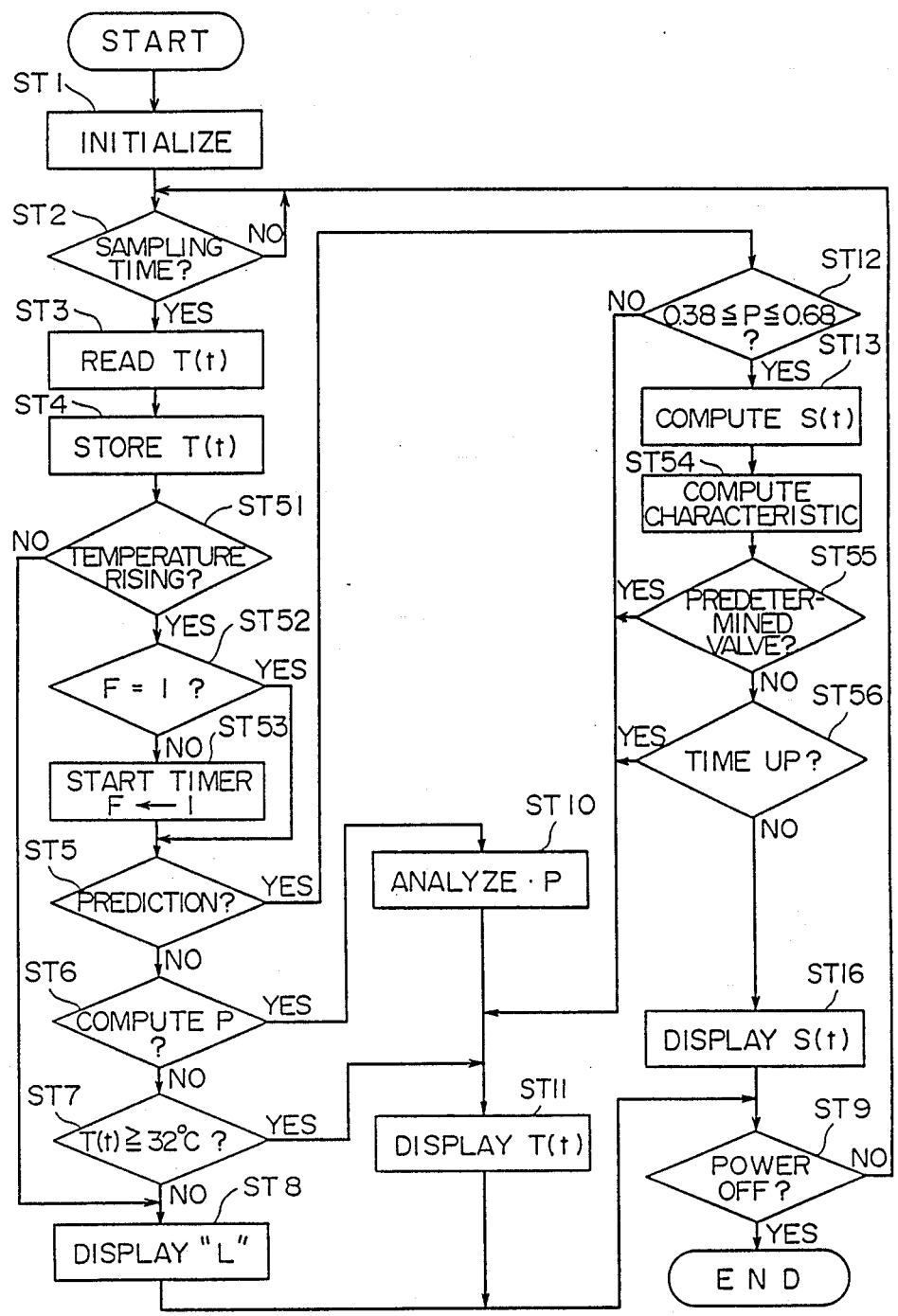
FIG. 5 is a flow chart illustrating the operations by the electronic thermometer.

FIG. 5 shows the operations by the electronic thermometer in this second embodiment, and the steps having the same functions as the steps of FIG. 2 are given the same reference numerals.

Upon turning on power switch 7, the thermometer is initialized (step ST 1), a sampled measured temperature is read and stored into memory 4 or storage means 42 (steps ST 2 through ST 4) in the same operations as FIG. 2. In step 51, the CPU determines if the measured temperature T(t) is rising. When the sampled temperature is not rising, a low temperature mark "L" is displayed on the display 5 or the display means 43 (step ST 8) and the sequence returns to step ST 2. If the measured temperature is rising, the sequence from step ST 51 advances to step ST 52 where a set flag F is inquired. When any flag is not set, the sequence flows to step ST 53 where a flag F is set and the timer means 48 is actuated at the time point tS where the measured temperature starts to rise. Subsequently, the sequence advances to step ST 5. If any flag is set, the sequence advances to step ST 5. The operations in steps ST 5 to ST 9 are the same as those in FIG. 2.

Until 40 seconds elapses from the start time point tS and the measured temperature T(t) reaches 32° C., the sequence in steps ST 2 to ST 4, ST 51 to ST 53, ST 5 to ST 8 is repeated and the low temperature mark "L" is displayed as shown by the solid line B in a time interval "l" in FIG. 6. If the measured temperature T(t) goes over 32° C., the display of "L" is changed to a display of the measured temperature as shown by the curve $A_2$ in a time interval "m" in FIG. 6 wherein the mark "°C." in the display 5 occurs to flicker.

If 40 seconds has elapsed from the start time point tS, a parameter P is computed in step ST 10 though the measured temperature T(t) is displayed (step ST 11). At the subsequent sampling time when 40 seconds has already elapsed and there is the computed parameter P, the prediction by the thermometer is permitted (step ST 5) and whether the computed parameter P is within a predetermined range ($0.38 \leq P \leq 0.68$) is inquired (step ST 12). If P is out of the range, the measured temperature remains to be displayed as it is without predicting any converged value (step ST 11).

If the parameter P is within the range, the prediction computing means 44 computes a predicted value S(t) (step ST 13). In step ST 54, the compute means 46 computes the difference $\Delta T$ between the measured value T(t) and predicted value S(t) or the rising range $\Delta T/\Delta t$ to fine the characteristic values of the response curve of FIG. 6. In step ST 55, the judging means 47 determines if the difference $\Delta T$ or the rate $\Delta T/\Delta t$ is a predetermined value. If it is not larger than the predetermined, a "No" response is produced from step ST 55 and applied to step ST 56 in which the time-up of the timer means 48 is inquired. If the timer means 48 is still timing, the prediction switching means 45 switches the display from the measured value T(t) to the predicted value S(t) so that the indication on the display 5 (display means 43)

is changed from the curve $A_2$ to the curve C in a predicted display interval "n" wherein the mark "°C." is continuously displayed. For each subsequent sampling time, the predicted value S(t) is computed to correct displayed predicted temperature value and the characteristic values continue to be computed through step ST 54.

If the difference $\Delta T$ becomes smaller than 0.2° C. or the rising rate $\Delta T/\Delta t$ becomes a predetermined low rate as the measured value T(t) increases, a "YES" response is produced by the judging means 47 in step ST 55 and applied to step ST 11 wherein the display of the predicted value S(t) is changed to the display of the actually measured temperature T(t) by the measured value switching means 49 as shown in the curve $A_4$ in the measured value display interval "0" where the measured value T(t) becomes close to a converged temperature at which the measured value will finally stabilize. Moreover, the mark "°C." is displayed on a flickering mode again and the buzzer 6 is energized to alarm the completion of the body temperature measurement.

If the change of the characteristic values computed in step ST 54 is small and it will take a long time to reach the predetermined value, "NO" response continues to be produced from step ST 55. When the preset time interval measured by timer means 48 is reached, a "YES" response is produced in step ST 56 at the time point "tp" shown in FIG. 6 and applied to step ST 11 where the measured value T(t) is displayed instead of the predicted value by the display means 43. Upon turning off the power switch 7 (step ST 9), the operations in the thermometer are terminated.

Though the timer means 48 is initiated on the rising point "tS" in this embodiment, it may be alternatively initiated on the start point of the predicted value display interval "n". The electronic thermometer in this embodiment displays a predicted value when the response of the temperature sensor reaches a predetermined condition, and return the temperature display from the predicted value display mode of the actually measured value display mode if the measured value reaches a predetermined value or a predetermined time interval has elapsed, so that the observer can know a predicted temperature in advance and find the finally stabilizing actual-measured temperature at the most early timing with high accuracy.

Returning to FIG. 7 there is shown a basic construction of still another electronic thermometer which is modified from the thermometer in the first embodiment of FIGS. 1 to 3 in accordance with a third embodiment of this invention. This electronic thermometer of FIG. 7 also is embodied by the thermometer of FIG. 1 as explained about the foregoing embodiments. The thermometer includes temperature measuring means 71 embodied by the sensor 1 and the A/D converter 2 which measures the current temperature for each predetermined cycle, storage means 72 embodied by the memory 4 which stores the measured temperature data therein, prediction computing means 73 for predicting a predicted or anticipated temperature based on the measured temperature data, display means 74 embodied by the display 5 which displays a measured temperature or a predicted temperature, judging means 75 for determining if the response value of the response curve obtained by the temperature measuring means reaches a predetermined value, timer means 76 for timing a predetermined time interval from the time point when the above-mentioned response value reaches the predetermined value, and alarm means 77 embodied by the buzzer 6 which is energized upon elapse of the predetermined time interval. The means 73, 75 and 76 are embodied by the CPU 3.

Figure 8:
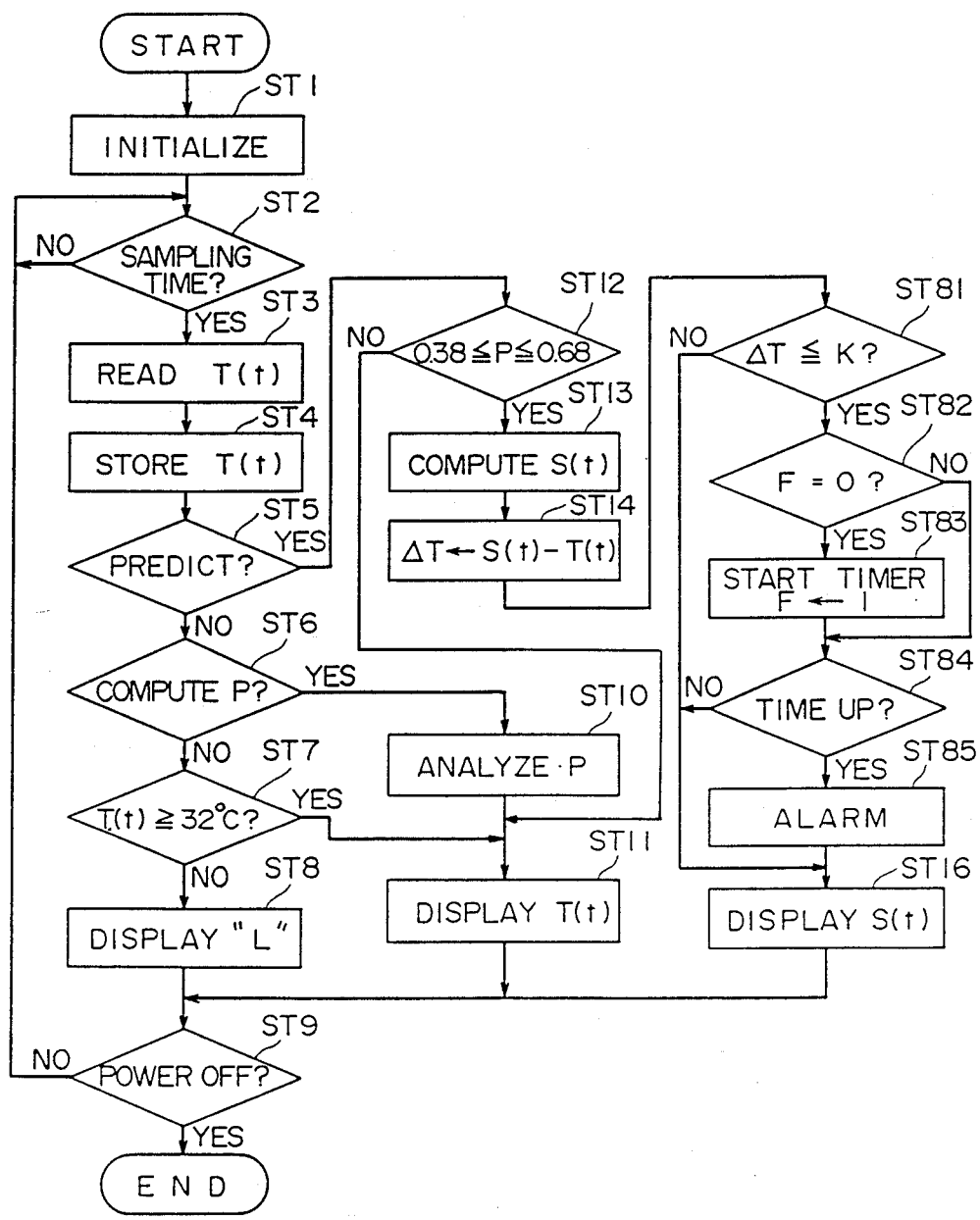
FIG. 8 is a flow chart illustrating the operations by the electronic thermometer.

The construction and the operations of the electronic thermometer in the third embodiment will be described hereinafter in detail in conjunction with FIGS. 1, 8, 9 and 10. FIG. 8 shows the operations by the thermometer, and the steps of FIG. 8 having the same operations as those in the flow chart of FIG. 2 are represented by the same reference numerals as those in FIG. 2.

In FIG. 8, upon turning on power switch 7, all states in the thermometer are initialized (step ST 1). Until 40 seconds elapses to enable the prediction in step ST 5, the sequence in steps ST 2 through ST 9 is repeated for each sampling cycle by the same operations as those in FIG. 2. Accordingly, if the measured temperature T(t) is below 32° C., a low temperature mark "L" is displayed as shown in a "L" display interval in FIG. 9 (step ST 8). If the measured temperature T(t) goes above 32° C. at the time point "a" of FIG. 9, the measured temperature T(t) is displayed (step ST 11) as shown in a measured value display interval between the time points "a" and "b" in FIG. 9.

If 40 seconds has elapsed, a parameter P is computed (steps ST 6 and ST 10). At the subsequent sampling time (steps from ST 2 to ST 5), the computed parameter P is compared with a predetermined range between 0.38 and 0.68 which is based on clinical data in body temperature measurements. Thus, the sequence in the steps ST 1 through ST 14 is performed by the same operations in FIG. 2. If the computed parameter P exists within the predetermined range (step ST 12), the difference $\Delta T$ between the predicted value S(t) computed by the prediction computing means 73 (step ST 13) and the measured temperature T(t) is computed (step ST 14). If the difference $\Delta T$ is larger than a predetermined value K (=1.5° C.) in step ST 81, the predicted value S(t) is displayed instead of the measured value T(t) as shown in a predicted value display interval between the time points "b" and "c" of FIG. 9 wherein since the difference $\Delta T$ is not negligible, the predicted value on display lacks reliability yet.

If the difference $\Delta T$ reaches the value K (1.5° C.), a "YES" response is produced from step ST 81 by the judging means 75 and in step ST 82 the set of flag F is inquired. If flag F is set, the sequence advances to step ST 84. Since the flag F is reset in step ST 1, the timer means 76 is actuated and the flag F is set to "1" (step ST83) as illustrated at the time point "c" of FIG. 9. In the time interval "tS" of FIG. 9, the predicted value S(t) is displayed (step ST 16). When the timer means 76 finishes its timing at time point "d" (step ST 84), the buzzer or alarm means 77 is energized to alarm that the displayed value is ready to be read by the observer (step ST 85).

Figure 9:
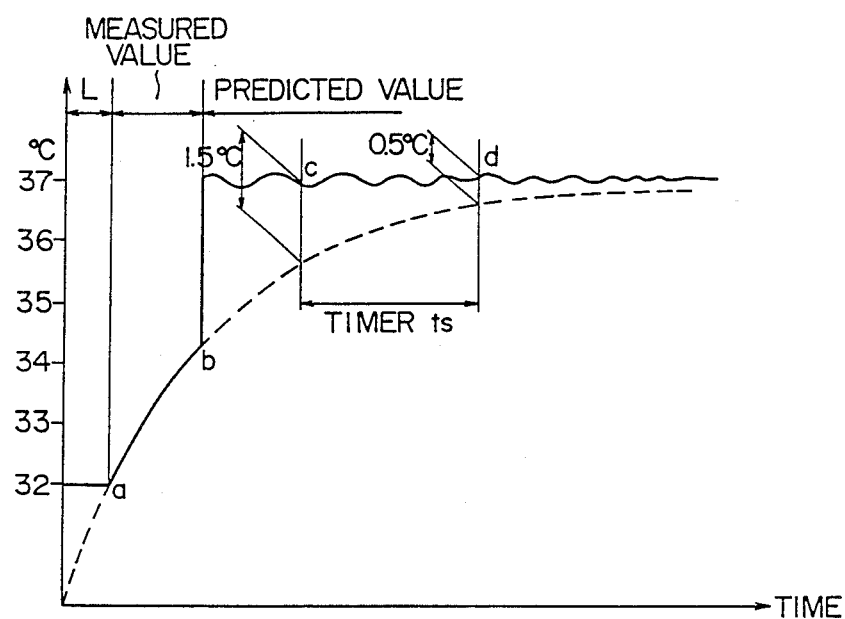
FIGS. 9 and 10 are graphs which illustrate measured temperature changes and display states in the electronic thermometer.

The response curve in FIG. 9 represents a relatively rapid rising rate of the body temperature by an observer, so that at the terminating point "d" of the timer means 76 as shown in FIG. 9 the difference $\Delta T$ between the predicted value and the measured value is close to 0.5° C. and the observer can read the predicted value having a high accuracy by hearing the alarm by the alarm means 77.

Figure 10:
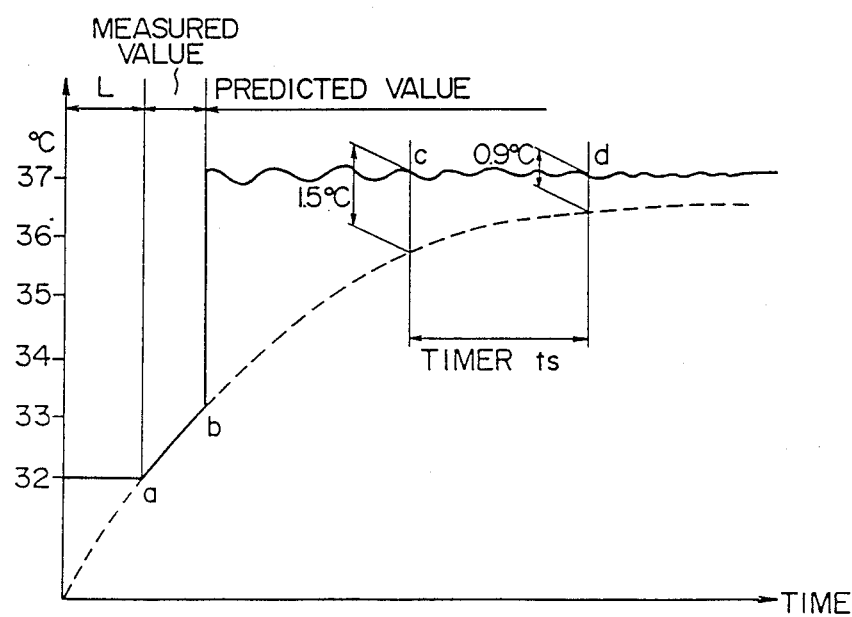

The response curve in FIG. 10 represents a relatively slow rising rate in another observation and at the time point "d" the difference $\Delta T$ is 0.9° C. In this case, relatively reliable predicted value is obtained in a relatively short time interval.

Figure 11:
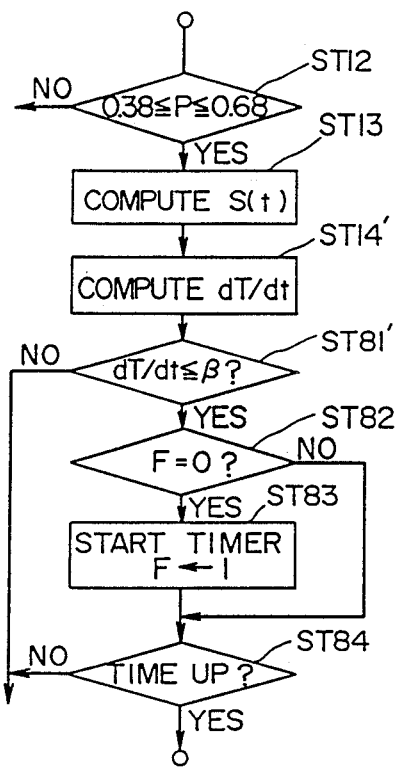
FIG. 11 is a partial flow chart of an electronic thermometer modified from the thermometer of FIG. 7.
Figure 12:
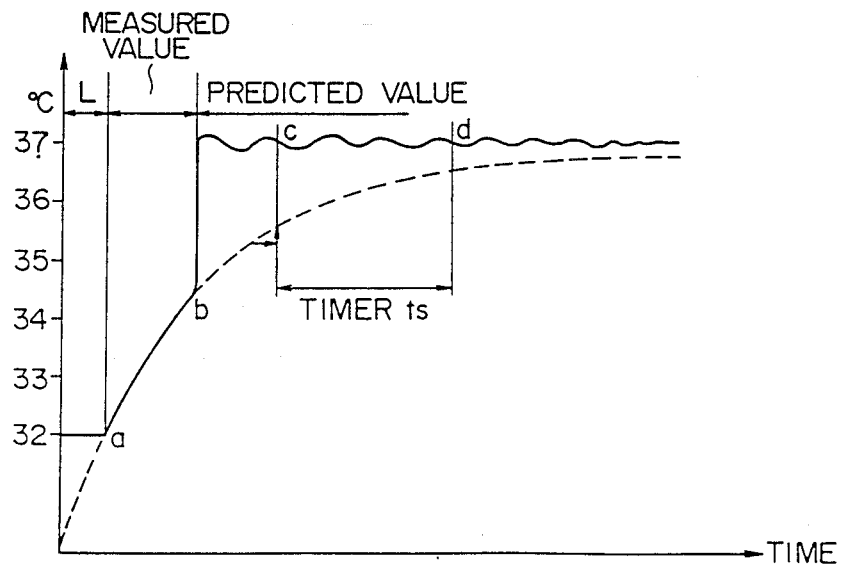
FIG. 12 is a graph illustrating measured temperature changes and display state in the thermometer.

Referring to FIG. 11, there is shown a modified flow chart from FIG. 8 in accordance with a modified embodiment from the third embodiment of this invention. Though in the third embodiment the time point at which the difference between the predicted value and the measured value reaches the predetermined value K (=1.5° C.) in the steps ST 14 and ST 81, the sequence in steps ST 14' and ST 81' of this embodiment inquires if the temperature rising rate dT/dt drops to a predetermined rate $\beta$ corresponding to the value K (=1.5° C.). Accordingly, the sequence from step ST 12 to step ST 84 in FIG. 11 is the same as the sequence in steps ST 12 to ST 84 in FIG. 8. If the rising rate dT/dt becomes within the predetermined rate $\beta$ (step ST 81'), the timer means is actuated (step ST 83). As illustrated in FIG. 12, the thermometer in this modified embodiment has a low temperature display "L" interval until time "a", a measured value display interval from time "a" to time "b", and a predicted value interval after time "b". Upon termination of the timer means 76 at the time point "d" in FIG. 12, the alarm means 77 is energized.

Many further modifications of the foregoing embodiments are possible and therefore the scope of this invention should be determined from following claims.

What is claimed is:

1. An electronic thermometer comprising
   sensing means for sensing a temperature to be taken thereby,
   storage means for storing therein a measured temperature value representing the temperature sensed by said sensing means,
   prediction means for computing a predicted temperature value based on said measured value stored in said storage means,
   display means for displaying, selectively, said measured temperature value and said predicted temperature value,
   judging means for determining whether or not a response value, of a response curve based on data of said measured temperature value, has attained a predetermined value at which to initiate an operation for changing a state of said display means;
   means for comparing said measured and predicted temperature values and producing a difference value; and
   means for switching the displaying of said display means according to said difference value reaching a threshold.

2. An electronic thermometer according to claim 1, further comprising timer means for timing a predetermined time interval, in which, upon termination of said predetermined time interval by said timer means, said switching means changes said display means from a predicted value display mode to a measured value display mode.

3. An electronic thermometer according to claim 1, in which said response value is a ratio of rates of change of said response curve, and said thermometer further comprises means for computing a ratio of rates of change of said response curve to produce said response value.

4. An electronic thermometer according to claim 1 and further comprising:
   timer means for timing a predetermined timing interval, said timer means being started by said judging means when said response value reaches said predetermined value; and means for providing a display indication representing completion of measurement by said thermometer upon termination of said predetermined timing interval.

5. An electronic thermometer according to claim 4, further comprising:
   an alarm means for providing a sound alarm upon completion of said measurement.

* * * * *